US012019855B2

(12) United States Patent
Aybar et al.

(10) Patent No.: US 12,019,855 B2
(45) Date of Patent: Jun. 25, 2024

(54) METHODS AND SYSTEMS FOR VEHICLE INTERFACE CONTROL

(71) Applicant: Ford Global Technologies, LLC, Dearborn, MI (US)

(72) Inventors: Yucel Aybar, Dearborn, MI (US); Christopher Harrison, Dearborn, MI (US); Rob Anthony Richardson, Dearborn, MI (US); Jonathan Rumford, Huntingdon (GB); Ryan Wells, Dearborn, MI (US); Will Mallard, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 3 days.

(21) Appl. No.: 17/687,174

(22) Filed: Mar. 4, 2022

(65) Prior Publication Data

US 2023/0280890 A1    Sep. 7, 2023

(51) Int. Cl.
| | | |
|---|---|---|
| *G06F 3/048* | (2013.01) |
| *B60K 35/00* | (2006.01) |
| *B60K 35/10* | (2024.01) |
| *G06F 3/04842* | (2022.01) |
| *B60K 35/28* | (2024.01) |
| *B60K 35/81* | (2024.01) |

(52) U.S. Cl.
CPC .......... *G06F 3/04842* (2013.01); *B60K 35/00* (2013.01); *B60K 35/10* (2024.01); *B60K 35/28* (2024.01); *B60K 35/81* (2024.01); *B60K 2360/166* (2024.01); *B60K 2360/167* (2024.01)

(58) Field of Classification Search
CPC ..... G06F 3/04842; B60K 35/00; B60K 37/06; B60K 2370/167; B60K 2370/166; B60K 2370/52; B60K 35/10; B60K 35/28; B60K 35/81; B60K 2360/166; B60K 2360/167
See application file for complete search history.

(56) References Cited

U.S. PATENT DOCUMENTS

| | | | |
|---|---|---|---|
| 6,240,347 B1 * | 5/2001 | Everhart | B60R 16/0373 701/1 |
| 6,912,985 B2 | 7/2005 | Gesell et al. | |
| 6,994,078 B2 | 2/2006 | Roberts | |
| 9,335,907 B2 * | 5/2016 | Schubert | G06F 3/04842 |
| 9,873,328 B2 * | 1/2018 | Patel | B60K 35/00 |
| 10,331,314 B2 * | 6/2019 | Webb | G06F 3/0488 |
| 11,005,720 B2 * | 5/2021 | Ricci | G06F 11/3065 |
| 2002/0085043 A1 * | 7/2002 | Ribak | B60W 50/14 715/810 |

(Continued)

FOREIGN PATENT DOCUMENTS

| | | | |
|---|---|---|---|
| JP | H08135458 A | 5/1996 |
| JP | 2015086705 A | 5/2015 |
| KR | 20070007254 A | 1/2007 |

*Primary Examiner* — Claudia Dragoescu
(74) *Attorney, Agent, or Firm* — Haley Guiliano LLP

(57) ABSTRACT

A vehicle interface control unit for a vehicle comprises an accessories module to detect an accessory fitted to the vehicle an input module to receive one or more input signals from a vehicle electronic control unit, ECU; and a display control module to determine a display setting of an interface element for control of the detected accessory based on the received input signals, and control a display unit to show the interface element according to the determination.

18 Claims, 3 Drawing Sheets

(56) References Cited

U.S. PATENT DOCUMENTS

| | | | |
|---|---|---|---|
| 2003/0063120 A1* | 4/2003 | Wong | G06F 9/451 |
| | | | 715/746 |
| 2006/0226298 A1* | 10/2006 | Pierson | A63H 19/24 |
| | | | 246/1 R |
| 2014/0277844 A1* | 9/2014 | Luke | B60L 53/305 |
| | | | 701/123 |
| 2015/0137585 A1 | 5/2015 | Ono | |
| 2016/0066127 A1* | 3/2016 | Choi | H04W 4/80 |
| | | | 455/41.2 |
| 2016/0098096 A1* | 4/2016 | Averill | B66C 13/18 |
| | | | 345/184 |
| 2017/0262158 A1* | 9/2017 | Webb | G06F 3/0488 |
| 2020/0198561 A1* | 6/2020 | Weed | B60R 16/0231 |
| 2020/0254875 A1* | 8/2020 | Strandberg | B60K 37/06 |

\* cited by examiner

METHODS AND SYSTEMS FOR VEHICLE INTERFACE CONTROL

BACKGROUND

The present disclosure relates to methods and systems of controlling a vehicle interface and a vehicles comprising said systems. More particularly, but not exclusively, the present disclosure relates to providing a vehicle interface for control of one or more accessories based on input signals from the electronic control unit (ECU).

SUMMARY

Many vehicles are fitted with accessories to extend the functionality of the vehicle. Third-party devices or aftermarket modifications may be added to the vehicle e.g. to adapt the vehicle for a specific application. Examples include beacons and sirens added to emergency vehicles, or a lifting mechanism and floodlights added to a maintenance vehicle.

Such accessories are generally controlled with mechanical or electrical switches in the vehicle cabin. Recently, software interfaces have provided control for accessories, however, such interfaces are specific to the accessories attached and typically include interface elements for each accessory which are in a fixed position on the interface.

In many cases, particularly when a large number of accessories are fitted to a vehicle, these hardware and software interfaces take up a lot of cabin space or display space respectively, even if the corresponding accessory is used only rarely. A large number of hardware or software switches fixed in position can also be difficult to read while the driver is operating the vehicle, which can cause unintended activation of an accessory (e.g. a tail lift), while driving.

There is therefore a need to provide an improved vehicle interface system which addresses these problems.

According to some aspects of the present invention, the systems and methods are provided that detect an accessory fitted to the vehicle; receive one or more input signals from a vehicle electronic control unit (ECU); determine a display setting of an interface element for control of the detected accessory based on the received input signals, and control a display unit to show the interface element according to the determination. In some examples, the display setting may comprise a setting relating to whether to display the interface element, e.g., whether to provide a user with an option for selecting the interface element. Additionally or alternatively, the display setting may comprise an arrangement of the interface element, e.g., position, size, color, opacity, etc., relative to one or more other shown interface elements. In some examples, the systems and methods determine the display setting of the interface element based on a position/orientation of a user, e.g., relative to a position/orientation of the display unit. For example, an ECU of the vehicle may provide one or more input signals based on an output of a vehicle system, such as an imaging system, an occupancy determination system, and/or any other appropriate system capable of determining a position/orientation of a user relative to the vehicle, e.g., relative to the display unit.

In some examples, the systems and methods determine a position of the interface element and/or an order of the interface element in a plurality of interface elements.

In some examples, the systems and methods send a control signal to the accessory in response to a user selection of the interface element.

In some examples, the systems and methods send a control signal to the accessory based on the received input signals.

In some examples, the systems and methods display an override element to override the control signal.

In some examples, the input signals include a vehicle status signal selected from a battery charge level, speed, current destination and fuel level.

In some examples, the input signals include an environmental signal selected from a time, date, location, temperature, weather, and/or traffic.

In some examples, the accessory is selected from lights, cameras, water pump and a lift mechanism, a power take-off unit, an electrical accessory, an electrical invertor, an electrical convertor (e.g., a DCDC convertor), a cooker, and/or any other appropriate accessory that may be fitted to a vehicle.

In some examples, the systems and methods show an interface element based on input signals from one or more accessories.

According to one aspect of the present invention, a vehicle interface control unit for a vehicle is provided. The vehicle interface control unit comprises an accessories module configured to detect an accessory fitted to the vehicle; an input module configured to receive one or more input signals from a vehicle electronic control unit (ECU); and a display control module configured to determine a display setting an interface element for control of the detected accessory based on the received input signals, and control a display unit to show the interface element according to the determination.

According to one aspect of the present invention, vehicle interface system comprising a display and the vehicle interface control unit is provided.

According to one aspect of the present invention, a vehicle comprising the vehicle interface system is provided.

According to one aspect of the present invention, a computer-implemented method for controlling a vehicle interface display unit for a vehicle is provided. The method comprises detecting, by an accessories module, an accessory fitted to the vehicle; receiving, by an input module, one or more input signals from a vehicle electronic control unit (ECU); and determining, by a display control module, whether to show an interface element for control of the detected accessory based on the received input signals, and controlling the display unit to adjust a display setting the interface element according to the determination.

According to one aspect of the present invention, a computer-readable medium is provided. The computer-readable may include instructions which, when executed by a processor, cause the processor to perform the steps of: detecting, by an accessories module, an accessory fitted to the vehicle; receiving, by an input module, one or more input signals from a vehicle electronic control unit (ECU); and determining, by a display control module, a display setting of an interface element for control of the detected accessory based on the received input signals, and controlling the display unit to show the interface element according to the determination.

It shall be appreciated that other features, aspects and variations of the present disclosure will be apparent from the disclosure of the drawings and detailed description. Additionally, it will be further appreciated that additional or alternative examples of methods of and systems for controlling an electrical accessory may be implemented within the principles set out by the present disclosure.

BRIEF DESCRIPTION OF THE DRAWINGS

The above and other objects and advantages of the disclosure will be apparent upon consideration of the following detailed description, taken in conjunction with the accompanying drawings, in which.

The figures herein depict various examples of the disclosed disclosure for purposes of illustration only. It shall be appreciated that additional or alternative structures, systems and methods may be implemented within the principles set out by the present disclosure.

DETAILED DESCRIPTION

Figure 1:
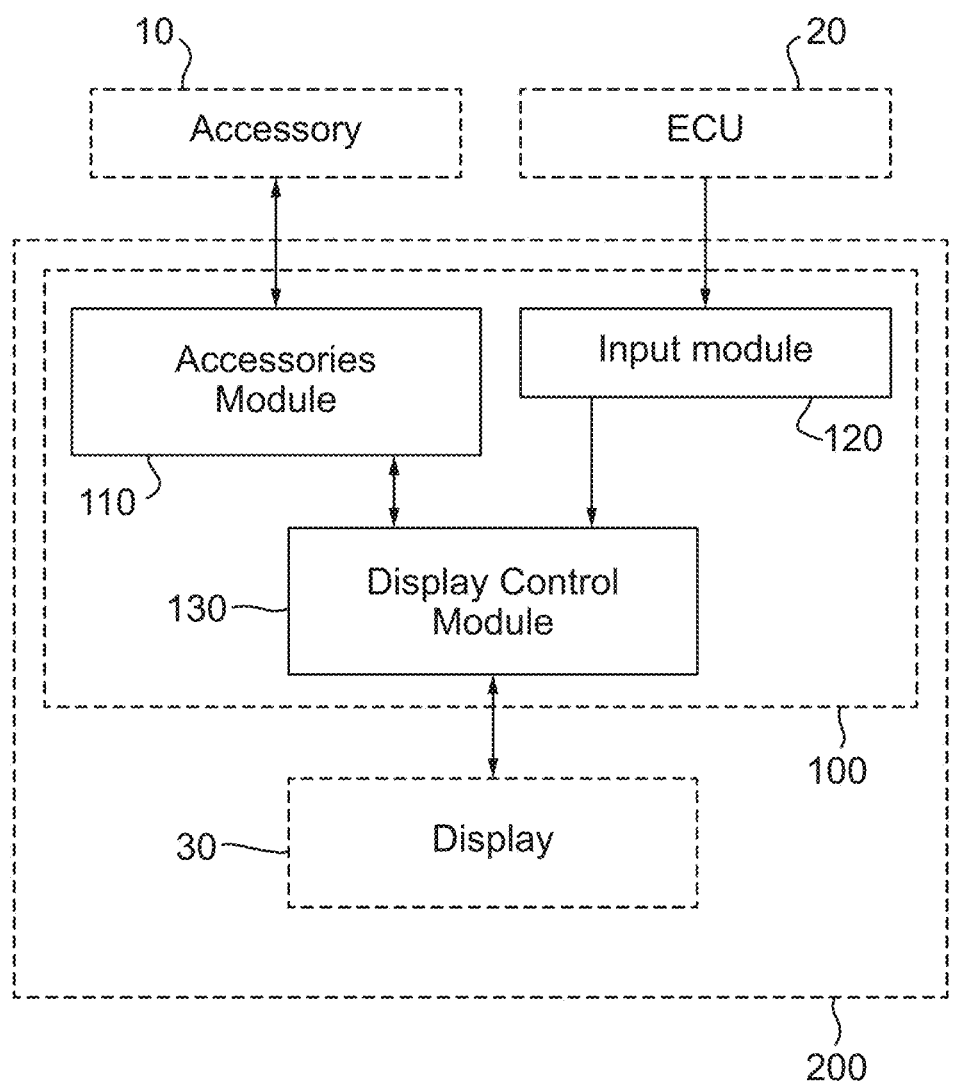
FIG. 1 illustrates an exemplary block diagram of a vehicle interface system, in accordance with some examples of the disclosure.

FIG. 1 shows a block diagram of a vehicle interface system 200 comprising a vehicle interface control unit 100, in accordance with some examples of the disclosure. The vehicle control system 100 comprises an accessories module 110, an input module 120 and a display control module 130.

The accessories module 110 is configured to detect an accessory 10 fitted to the vehicle. The accessory 10 may be a third-party component fitted to the vehicle. The vehicle may include an input/output (I/O) module to connect and provide power to one or more accessories. In some examples, the I/O module may include an auxiliary fuse box. The accessories module 110 may include a controller e.g. to control power supplied to each accessory 10, for example, using one or more field-effect transistor (FET) switches. The accessories module 110 may be configured to detect each accessory 10 connected with the I/O module. In some examples, the accessories module 110 may receive an input signal from one or more of the connected accessories.

In some examples, the accessory 10 may include one or more lights. For example, the accessory 10 may include externally attached lights for driving, e.g. high level lights, fog lights or trailer lights, the accessory 10 may include externally attached lights not suitable for driving, e.g. flood lights or light for advertising signs, and/or the accessory 10 may include one or more beacons or flashing lights e.g. orange lights fitted to a slow-moving vehicle or blue/red lights fitted an emergency vehicle. In some examples, the accessory 10 may include one or more audio devices, e.g. a loudspeaker, public address (PA) or a siren.

In some examples, the accessory 10 may include one or more cameras. For example, the accessory 10 may include one or outward facing cameras for driving visibility, e.g. rear-view camera, dash cam or blind-spot cameras, or the accessory 10 may include one or more inward facing cameras for e.g. monitoring a load or passengers of the vehicle.

In some examples, the accessory 10 may include a refrigeration unit. In some examples, the accessory 10 may include a water pump, e.g., for a vehicle adapted to include a personal water supply or shower, or a vehicle adapted for firefighting. In some examples, the accessory 10 may include one or more lift mechanism, e.g., a tail lift, boom lift or scissor lift.

The input module 120 is configured to receive one or more input signals from a vehicle electronic control unit (ECU) 20.

In some examples, the input signals may include a vehicle status signal. For example, the input signals may include a battery charge signal indicating a current batter charge level of a primary and/or secondary battery on the vehicle. In some examples, the input signals may include a fuel level of the vehicle. In some examples, the input signals may include driving metrics, e.g., the vehicle speed output by a speedometer of the vehicle, the vehicle engine speed (e.g., in revolutions per minute) output by a tachometer of the vehicle, a current gear of the vehicle, a trip or overall mileage output by an odometer of the vehicle. In some examples, the input signals may include a current destination set in a navigation unit of the vehicle.

In some examples, the input signals may include an environmental signal. For example, the input signals may include a current time, current date, location of the vehicle, outside temperature, local weather, and/or local traffic.

The display control module 130 is configured to determine whether to show an interface element for control of the detected accessory 10 based on the received input signals. In this way, an interface element for control of an accessory 10 can be displayed when it is more appropriate and useful, e.g., when it is safe to use the accessory 10 or when the accessory 10 is expected to be used.

In some examples, the display control module 130 may determine whether to show an interface element based on a vehicle status signal. For example, the display control module 130 may show an interface element for a lift mechanism only when the vehicle speed is zero, and/or when the battery charge level indicates there is sufficient power to operate the lift mechanism.

In some examples, the display control module 130 may determine whether to show an interface element based on an environmental signal. For example, the display control module 130 may show an interface element for a lift mechanism during the scheduled working hours of the driver.

The display control module 130 is configured to control a display unit 30 to show the interface element according to the determination. For example, the display unit 30 may include a screen or touchscreen device connected with the display control module 130. The display unit 30 may be integrated into the vehicle or may be a separate, e.g., third party, unit. The display control module 130 may control the display unit 30 to output a graphical user interface (GUI), where the GUI includes the interface element according to the determination.

In this way, the vehicle interface control unit can provide the user, e.g., the driver of the vehicle, with suitable interface elements based on the context, status and environment of the vehicle. In this way, the driver can conveniently and safely navigate and select a desired accessory 10 whether they are driving the vehicle or not. In this way, the vehicle interface control unit can save the driver's time by providing a more efficient user experience, as well as improving safety by preventing confusion while driving and preventing the accidental activation of inappropriate accessories.

Figure 2:
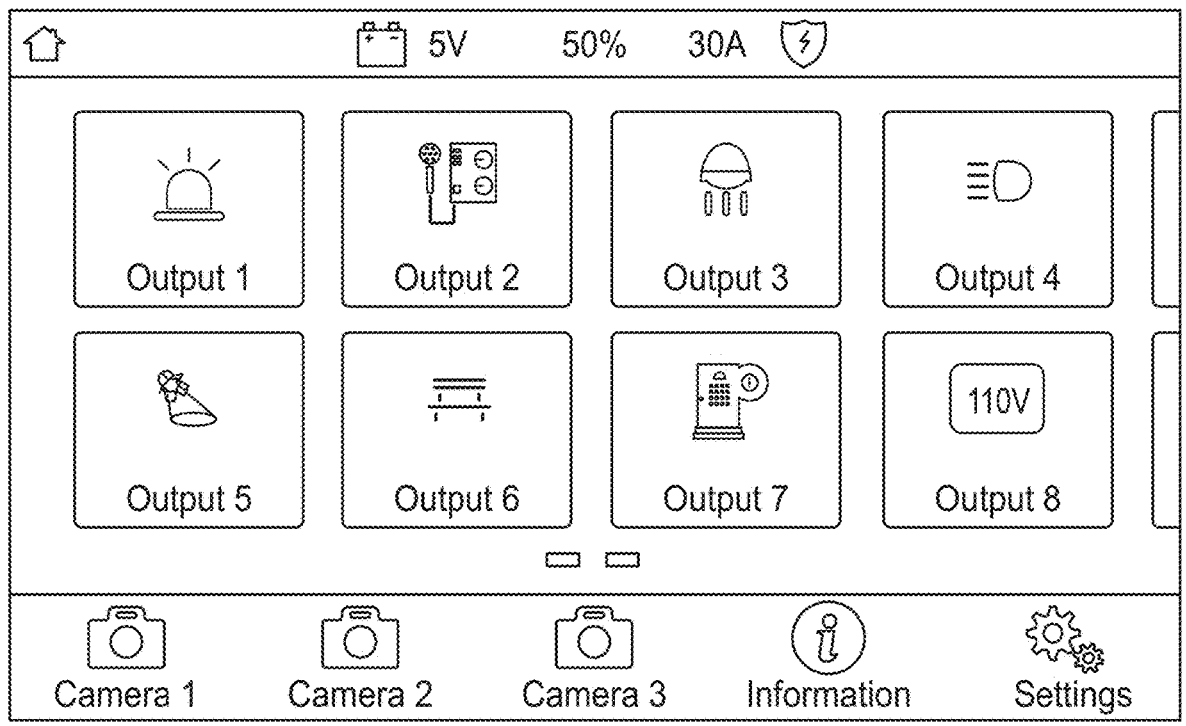
FIG. 2 illustrates an exemplary interface of a vehicle interface system, in accordance with some examples of the disclosure.

FIG. 2 shows an exemplary interface of a vehicle interface system. A first GUI output by the display unit 30 is shown.

In some examples, the display control module 130 may be configured to determine a position of the interface element. That is, the display control module 130 may determine a position on a screen at which the interface element is to be displayed. In some examples, the display control module 130 may determine a size of the interface element. As shown, the display control module 130 has determined the location of eight interface elements of equal size.

As shown, the first GUI includes a first interface element with a label "Output 1", which corresponds to a flashing beacon, e.g., a blue flashing beacon for an emergency vehicle. The first GUI includes a second interface element with a label "Output 2", which corresponds to a loudspeaker or PA. The first GUI includes a third interface element with a label "Output 3", which corresponds to a light, e.g., an internal cabin light. The first GUI includes a fourth interface element with a label "Output 4", which corresponds to a light, e.g., external fog lights. The first GUI includes a fifth interface element with a label "Output 5", which corresponds to a light e.g. an external floodlight. The first GUI includes a sixth interface element with a label "Output 6", which corresponds to a lifting mechanism e.g. a tail lift. The first GUI includes a seventh interface element with a label "Output 7", which corresponds to a water pump e.g. a shower unit. The first GUI includes an eighth interface element with a label "Output 8", which corresponds to a generic voltage output, e.g., for an user-defined accessory 10, e.g., a charging unit for a tool.

In some examples, the display control module 130 may be configured to determine an arrangement, e.g., an order, position, size, shape and/or spacing, of the interface element relative to another interface element in a plurality of interface elements. For example, in the first GUI shown, the display control module 130 may arrange the eight interface elements based on the input signals. For example, based on the vehicle status and/or environmental signals, the display control module 130 can determine a priority of each accessory 10 and control the display unit 30 to display the corresponding interface elements in order of the determined priorities. For example, based on the time of day, e.g., a time which corresponds to operating hours of an emergency vehicle, the display control module 130 may determine an order of interface elements which begins with the first interface element, corresponding to flashing beacons, and the second interface element, corresponding to a loudspeaker or PA.

In addition, the first GUI includes a plurality of camera interface elements. In the example, the display control module 130 has determined a separate location and for one or more interface elements relating to camera accessories.

Additionally or alternatively, the appearance of each of the one or more interface elements may be configurable based on one or more factors, e.g., based on user selection, accessory condition, vehicle location, etc. For example, a user may wish to adjust the appearance of an icon representing an interface elements, e.g., by changing the type/style of the icon, changing the icon label/name, and so on. Additionally or alternatively, display control module 130 may be configured to automatically configure the appearance of one or more interface elements, e.g., based on an input from the accessories module 110 and/or the input module 120. For example, accessories module 110 may output a signal indicating that a light of a light cluster is not illuminating correctly. In response to this, display control module 130 may be configured to adjust the appearance of an interface elements for controlling the light cluster so as to indicate a fault with the light cluster. Additionally or alternatively, display control module 130 may also reposition the interface elements for controlling the light cluster on the GUI, so that the interface elements for controlling the light cluster is presented for easier user interaction, e.g., without the user scrolling through a list of interface elements for controlling various accessories.

In some examples, the vehicle interface system 200 may be configured to connect to one or more displays external to the vehicle. For example, the vehicle interface system 200 may be operationally coupled, e.g., by virtue of a wireless network, to one or more mobile devices, such as a smartphone and/or a controller of an accessory. In some examples, the vehicle interface system 200 may be configured to transfer and/or mirror display 30 on the mobile device. In this manner, a user may still benefit from the above advantages when outside the vehicle, e.g., operating one or more accessories. In some examples, transferring and/or mirroring the display on a mobile device may be based on one or more conditions, e.g., when a user in within a predetermined distance of an accessory, such as lift. In some examples, display control module 130 may be configured to determine a display setting an interface element based on a user interaction with an accessory. For example, in response to a user approaching, or interacting with, an accessory, a display setting of one or more interface elements may be adjusted, e.g., so as to provide improved access to the accessory with which the user is interacting.

Figure 3:
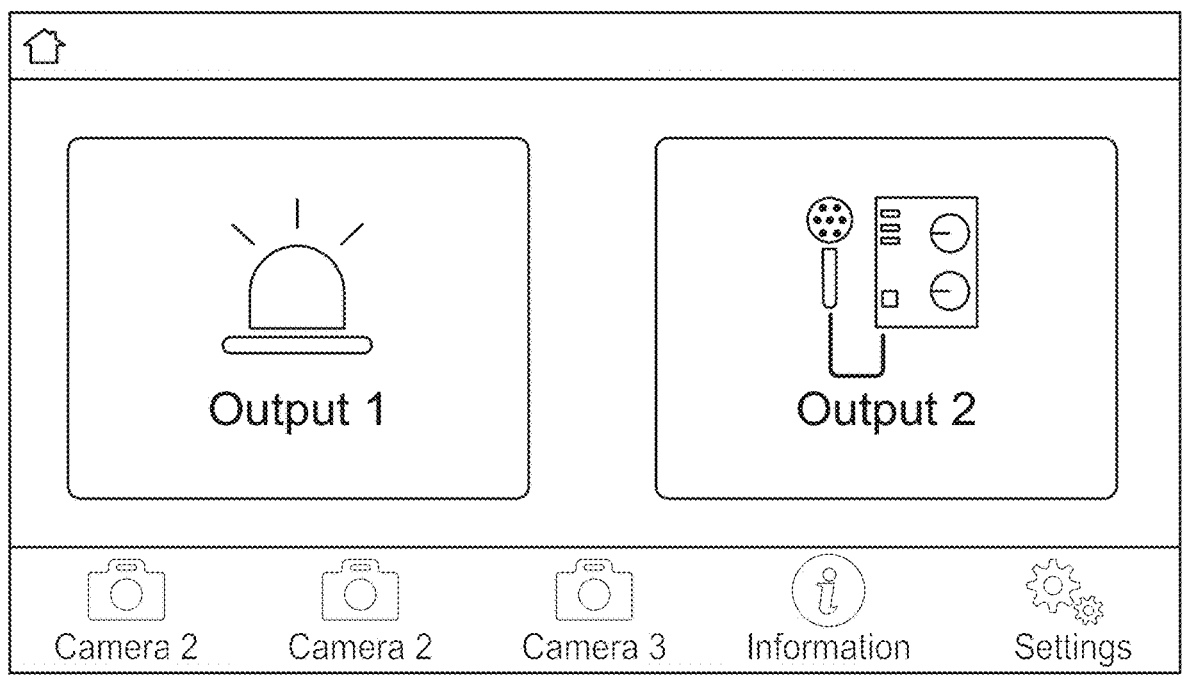
FIG. 3 illustrates an exemplary interface of a vehicle interface system, in accordance with some examples of the disclosure.

FIG. 3 shows an exemplary interface of a vehicle interface system. A second GUI output by the display unit 30 is shown. The second GUI may be shown by the display unit 30 in response to a change in the input signals, e.g., a change in vehicle status or environment. For example, the display control module 130 may control the display unit 30 to change from the first GUI to the second GUI based an input signal from the speedometer to indicate that the vehicle is moving.

Based on an input signal indicating that the vehicle is moving, the display control module 130 may determine not to display one or more interface elements corresponding to accessories which are not suitable for use while the vehicle is in motion, e.g., a lifting mechanism or floodlight. Based on an input signal indicating that the vehicle is moving, the display control module 130 may increase a size of one or more elements corresponding to accessories which are commonly used while the vehicle is in motion, e.g. flashing beacons. Based on an input signal indicating that the vehicle is moving, the display control module 130 may adjust a position of one or more interface elements, e.g., to give priority to those accessories which are commonly used while the vehicle is in motion. For example, control module 130 may adjust the arrangement of the one or more interface elements to provide an operator of the vehicle (or an accessory) with easier access to one or more specific interface elements, e.g., by moving an interface elements closer to a driver's seat or a position from which the accessory is to be operated.

As shown, the display control module 130 may have determined that the first interface element and second interface element are most useful while the vehicle is in motion. The display control module 130 has reduced the number of interface element to show only the first and second interface elements. The size of the first and second interface elements has been increased to highlight these elements and improve usability, e.g., by making these elements easier to select while driving.

In some examples, based on one or more input signals, the display control module 130 may deactivate or activate one or more interface elements. For example, based on an input signal indicating that the vehicle is moving, the display control module 130 may deactivate the plurality of interface elements corresponding to camera accessories. As shown, these elements are displayed on the display unit 30, but cannot be selected (indicated by the grey color of each element).

In some examples, the display control module 130 may be configured to show an interface element based on input signals from one or more accessories. For example, a refrigeration unit may provide an input signal indicating an internal temperature of the unit, or a lifting mechanism may provide an input signal indicating a current height of the lift. In some examples, the display control module 130 may be configured to show an interface element to display a condition of the accessory 10 based on the input signal, e.g., an interface element may display a temperature of the refrigeration unit and/or a height of the lifting mechanism. In some examples, the display control module 130 may be configured to show an interface element corresponding to a first accessory based on an input signal from a second accessory, e.g., the display control module 130 may show an interface element for a floodlight based on an input signal which indicates that a lifting mechanism is in a raised position.

In some examples, the accessories module 110 may be configured to send a control signal to the accessory 10 in response to a user selection of the interface element. The display unit 30 may include a touchscreen and/or one or more hardware buttons for selection of the displayed interface elements. In response to the user selection of an interface element, the display unit 30 may provide a selection signal to the display control module 130, which may provide the selection signal to the accessories module 110. The accessories module 110 may be configure to send a control signal to the accessory 10 corresponding to the selected interface element. The control signal may, for example, activate or deactivate the accessory 10. In some examples, the control signal may change a control parameter of the accessory 10, e.g., a brightness of one or more lights.

In some examples, the accessories module 110 may be configured to send a control signal to the accessory 10 based on the received input signals. For example, the accessories module 110 may send a control signal to lower a lifting mechanism based on an input signal indicating a battery charge below a threshold. In this way, the vehicle interface control unit can prevent the lifting mechanism from getting stuck in an elevated position when the battery is emptied.

In some examples, the display control module 130 may be configured to display an override element to override the control signal. For example, when it is hazardous to lower the lifting mechanism (in the above example), the user may be presented with an option to override the control signal.

Figure 4:
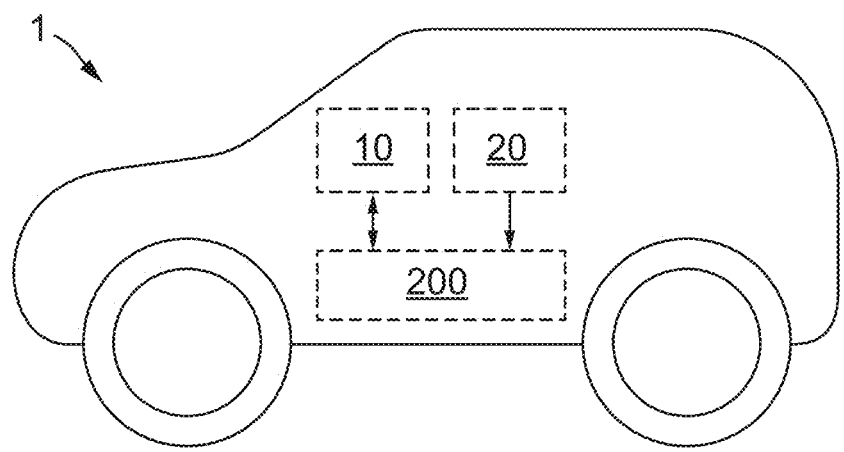
FIG. 4 illustrates an exemplary diagram of a vehicle comprising a vehicle interface system, in accordance with some examples of the disclosure.

FIG. 4 shows a vehicle 1, in accordance with some examples of the disclosure. The vehicle comprises the vehicle interface system 200 of the example shown in FIG. 1.

Figure 5:
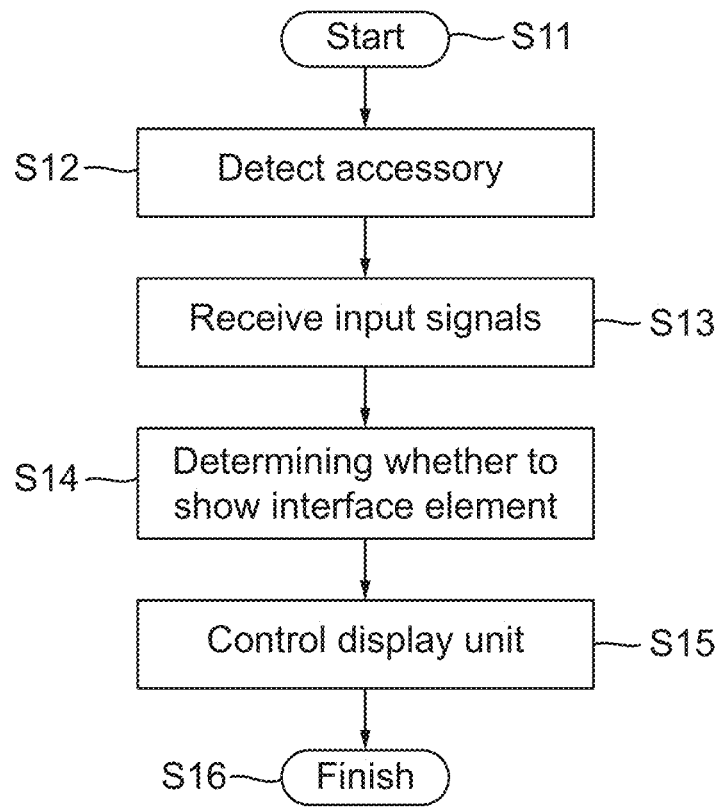
FIG. 5 illustrates an example flowchart of a method of controlling a vehicle interface display unit, in accordance with some examples of the disclosure.

FIG. 5 is a flowchart representing an illustrative process for controlling a vehicle interface display unit, in accordance with some examples of the disclosure.

The process starts at step S11.

At step S12, an accessory fitted to the vehicle is detected by an accessories module.

The accessory may be a third-party component fitted to the vehicle. In some examples, the accessory may include one or more lights. For example, the accessory may include externally attached lights for driving, e.g. high level lights, fog lights or trailer lights, the accessory may include externally attached lights not suitable for driving, e.g., flood lights or light for advertising signs, or the accessory may include one or more beacons or flashing lights, e.g., orange lights fitted to a slow-moving vehicle or blue/red lights fitted an emergency vehicle. In some examples, the accessory may include one or more audio devices, e.g. a loudspeaker, public address (PA) or a siren.

In some examples, the accessory may include one or more cameras. For example, the accessory may include one or outward facing cameras for driving visibility, e.g., rear-view camera, dash cam or blind-spot cameras, or the accessory may include one or more inward facing cameras for e.g. monitoring a load or passengers of the vehicle.

In some examples, the accessory may include a refrigeration unit. In some examples, the accessory may include a water pump, e.g., for a vehicle adapted to include a personal water supply or shower, or a vehicle adapted for firefighting. In some examples, the accessory may include one or more lift mechanism, e.g. a tail lift, boom lift or scissor lift.

At step S13, one or more input signals from a vehicle electronic control unit (ECU) are received by an input module.

In some examples, the input signals may include a vehicle status signal. For example, the input signals may include a battery charge signal indicating a current batter charge level of a primary and/or secondary battery on the vehicle. In some examples, the input signals may include a fuel level of the vehicle. In some examples, the input signals may include driving metrics, e.g., the vehicle speed output by a speedometer of the vehicle, the vehicle engine speed (e.g., in revolutions per minute) output by a tachometer of the vehicle, a current gear of the vehicle, a trip or overall mileage output by an odometer of the vehicle. In some examples, the input signals may include a current destination set in a navigation unit of the vehicle.

In some examples, the input signals may include an environmental signal. For example, the input signals may include a current time, current date, location of the vehicle, outside temperature, local weather, and/or local traffic.

At step S14, a display control module determines whether to show an interface element for control of the detected accessory based on the received input signals.

In this way, an interface element for control of an accessory can be displayed when it is more appropriate and useful, e.g., when the accessory is expected to be used.

In some examples, an interface element may or may not be shown based on a vehicle status signal. For example, an interface element for a lift mechanism may be shown only when the vehicle speed is zero, or when the battery charge level indicates there is sufficient power to operate the lift mechanism.

In some examples, an interface element may or may not be shown based on an environmental signal. For example, an interface element for a lift mechanism may be shown during the scheduled working hours of the driver.

At step S15, the display unit is controlled by the display control module to show the interface element according to the determination. The display unit may be controlled to output a graphical user interface (GUI), where the GUI includes the interface element according to the determination.

In this way, the user, e.g., the driver of the vehicle or an operator of the accessory, can be provided with suitable interface elements based on the context, status and environment of the vehicle. In this way, the driver or the operator can conveniently navigate and select a desired accessory whether they are driving the vehicle or not. In this way, the vehicle interface control unit can save the driver's time by providing a more efficient user experience, as well as preventing confusion while driving and preventing the accidental activation of inappropriate accessories. In some examples, a position of the interface element may be determined. That is, a position on a screen at which the interface element is to be displayed. In some examples, a size of the interface element may be determined.

In some examples, an order of the interface element in a plurality of interface elements may be determined. For example, based on the vehicle status and/or environmental signals, a priority of each accessory may be determined and the corresponding interface elements may be displayed in order of the determined priorities. For example, based on the time of day, e.g. a time which corresponds to operating hours of an emergency vehicle, an order of interface elements may be determined which begins with an interface element corresponding to flashing beacons and an interface element corresponding to a loudspeaker or PA.

In another example, based on an input signal from a speedometer indicating that the vehicle is moving, one or more interface elements may not be displayed which correspond to accessories not suitable for use while the vehicle is in motion, e.g. a lifting mechanism or floodlight. Based on an input signal indicating that the vehicle is moving, a size of one or more elements corresponding to accessories which are commonly used while the vehicle is in motion, e.g., flashing beacons, may be increased. Based on an input signal indicating that the vehicle is moving, a position of one or more interface elements may be adjusted e.g. to give priority to those accessories which are commonly used while the vehicle is in motion.

In some examples, an interface element may be shown based on input signals from one or more accessories. For example, a refrigeration unit may provide an input signal indicating an internal temperature of the unit, or a lifting mechanism may provide an input signal indicating a current height of the lift. In some examples, an interface element may display a condition of the accessory based on the input signal, e.g., an interface element may display a temperature of the refrigeration unit or a height of the lifting mechanism. In some examples, an interface element may be shown corresponding to a first accessory based on an input signal from a second accessory, e.g., an interface element for a floodlight may be shown based on an input signal which indicates that a lifting mechanism is in a raised position.

In some examples, a control signal may be sent to the accessory in response to a user selection of the interface element. The control signal may, for example, activate or deactivate the accessory. In some examples, the control signal may change a control parameter of the accessory e.g. a brightness of one or more lights.

In some examples, a control signal may be sent to the accessory based on the received input signals. For example, a control signal may be sent to lower a lifting mechanism based on an input signal indicating a battery charge below a threshold. In this way, the lifting mechanism can be prevented from getting stuck in an elevated position when the battery is emptied.

In some examples, an override element may be displayed to override the control signal. For example, when it is hazardous to lower the lifting mechanism (in the above example), the user may be presented with an option to override the control signal.

The process finishes at step S16.

This disclosure is made for the purpose of illustrating the general principles of the systems and processes discussed above and are intended to be illustrative rather than limiting. More generally, the above description is meant to be exemplary and not limiting and the scope of the disclosure is best determined by reference to the appended claims. In other words, only the claims that follow are meant to set bounds as to what the present disclosure includes.

While the present disclosure is described with reference to particular example applications, it will be appreciated that the disclosure is not limited hereto and that particular combinations of the various features described and defined in any aspects can be implemented and/or supplied and/or used independently. It will be apparent to those skilled in the art that various modifications and improvements may be made without departing from the scope and spirit of the present disclosure.

Those skilled in the art would appreciate that the actions of the processes discussed herein may be omitted, modified, combined, and/or rearranged, and any additional actions may be performed without departing from the scope of the disclosure.

Any system features as described herein may also be provided as a method feature and vice versa. As used herein, means plus function features may be expressed alternatively in terms of their corresponding structure. It shall be further appreciated that the systems and/or methods described above may be applied to, or used in accordance with, other systems and/or methods.

Any feature in one aspect may be applied to other aspects, in any appropriate combination. In particular, method aspects may be applied to system aspects, and vice versa. Furthermore, any, some and/or all features in one aspect can be applied to any, some and/or all features in any other aspect, in any appropriate combination.

What is claimed is:

1. A vehicle interface control unit for a vehicle, comprising:
   an accessories module configured to detect a plurality of accessories fitted to the vehicle;
   an input module configured to receive one or more input signals from a vehicle electronic control unit, ECU; and
   a display control module configured to:
      determine a display setting of an interface element for control of the detected accessories based on the received input signals;
      determine a priority of each accessory;
      control a display unit and at least one mobile device to show the interface element according to the determined priorities; and
      wherein the input signals include a vehicle status signal selected from a battery charge level, speed, current destination and fuel level.

2. The vehicle interface control unit of claim 1, wherein the display control module is further configured to determine a position of the interface element or an order of the interface element in a plurality of interface elements.

3. The vehicle interface control unit of claim 1 wherein, in response to a user selection of the interface element, the accessories module is configured to send a control signal to the accessory.

4. The vehicle interface control unit of claim 1, wherein the accessories module is configured to send a control signal to the accessory based on the received input signals.

5. The vehicle interface control unit of claim 4, wherein the display control module is further configured to display an override element to override the control signal.

6. The vehicle interface control unit of claim 1, wherein the input signals include an environmental signal selected from a time, date, location, temperature, weather, and traffic.

7. The vehicle interface control unit of claim 1, wherein the one or more input signals from the vehicle ECU relate to the position of a user relative to the vehicle.

8. The vehicle interface control unit of claim 1, wherein the display control module is further configured to show an interface element based on input signals from one or more accessories.

9. The vehicle interface control unit of claim 1, wherein the vehicle interface control unit is coupled to a vehicle interface device comprising a display.

10. The vehicle interface control unit of claim 9, wherein the vehicle interface device is implemented in the vehicle.

11. A computer-implemented method for controlling a vehicle interface display unit for a vehicle, comprising:
   detecting a plurality of accessories fitted to the vehicle;
   receiving one or more input signals from a vehicle electronic control unit, ECU;
   determining a display setting of an interface element for control of the detected accessories based on the received input signals;
   determining a priority of each accessory;
   controlling the display unit and at least one mobile device to show the interface element according to the determined priorities; and
   wherein the input signals include a vehicle status signal selected from a battery charge level, speed, current destination and fuel level.

12. The computer-implemented method of claim 11, further comprising:
   determining a position of the interface element or an order of the interface element in a plurality of interface elements.

13. The computer-implemented method of claim 11, further comprising:
   in response to a user selection of the interface element, sending a control signal to the accessory.

14. The computer-implemented method of claim 11, further comprising:
   sending a control signal to the accessory based on the received input signals.

15. The computer-implemented method of claim 14, further comprising:
   generating for display an override element to override the control signal.

16. The computer-implemented method of claim 11, wherein the input signals include an environmental signal selected from a time, date, location, temperature, weather, and traffic.

17. The computer-implemented method of claim 11, wherein the one or more input signals from the vehicle ECU relate to the position of a user relative to the vehicle.

18. The computer-implemented method of claim 11, further comprising:
   generating for display an interface element based on input signals from one or more accessories.

* * * * *